US009681280B2

(12) United States Patent
Balthasar et al.

(10) Patent No.: US 9,681,280 B2
(45) Date of Patent: Jun. 13, 2017

(54) EMERGENCY EVACUATION SERVICE

(71) Applicant: Intel Corporation, Santa Clara, CA (US)

(72) Inventors: Eddie Balthasar, Bellingham, WA (US); Craig Owen, Folsom, CA (US); David Stanasolovich, Beaverton, OR (US); Catherine W. Spence, Merrimack, NH (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/353,627

(22) PCT Filed: Dec. 6, 2013

(86) PCT No.: PCT/US2013/075466
§ 371 (c)(1),
(2) Date: Apr. 23, 2014

(87) PCT Pub. No.: WO2015/084415
PCT Pub. Date: Jun. 11, 2015

(65) Prior Publication Data
US 2016/0269882 A1      Sep. 15, 2016

(51) Int. Cl.
*G08B 21/00* (2006.01)
*H04W 4/22* (2009.01)
(Continued)

(52) U.S. Cl.
CPC .............. *H04W 4/22* (2013.01); *G01C 21/00* (2013.01); *G08B 7/066* (2013.01); *G08B 27/006* (2013.01);
(Continued)

(58) Field of Classification Search
None
See application file for complete search history.

(56) References Cited

U.S. PATENT DOCUMENTS 5,335,180 A * 8/1994 Takahashi ............ G08G 1/0104
701/117
7,035,650 B1 * 4/2006 Moskowitz ........... G01S 5/0247
340/995.23
(Continued)

FOREIGN PATENT DOCUMENTS

JP       2013073300 A    4/2013
KR    1020050023925 A    3/2005
(Continued)

OTHER PUBLICATIONS

"International Application Serial No. PCT/US2013/075466, International Preliminary Report on Patentability mailed Jun. 30, 2016", 12 pgs.
(Continued)

*Primary Examiner* — Jonathan M Dager
(74) *Attorney, Agent, or Firm* — Schwegman Lundberg & Woessner, P.A.

(57) ABSTRACT

Various systems and methods for providing an emergency evacuation service are described herein. An apparatus to provide an emergency evacuation service comprises an emergency event detection module to detect the existence of an emergency event at a venue; a transceiver to request and receive evacuation instructions from an emergency evacuation system, in response to detecting the existence of the emergency event; and a controller to process the evacuation instructions and display, to a user of the apparatus, information related to the evacuation instructions.

20 Claims, 5 Drawing Sheets

(51) Int. Cl.
- *G08B 7/06* (2006.01)
- *G01C 21/00* (2006.01)
- *G08B 27/00* (2006.01)
- *H04L 29/08* (2006.01)
- *H04W 4/04* (2009.01)
- *H04W 8/24* (2009.01)

(52) U.S. Cl.
CPC ......... *H04L 67/1002* (2013.01); *H04W 4/043* (2013.01); *H04W 8/24* (2013.01)

(56) References Cited

U.S. PATENT DOCUMENTS

| | | | | |
|---|---|---|---|---|
| 7,222,080 B2* | 5/2007 | Hale | ............ | G06Q 10/02 340/4.6 |
| 7,259,656 B1* | 8/2007 | Wright | ............ | G01C 21/20 340/286.14 |
| 7,579,945 B1* | 8/2009 | Richter | ............ | G08B 7/066 340/286.14 |
| 7,587,274 B2* | 9/2009 | Kaldewey | ............ | G01C 21/00 340/995.1 |
| 7,880,610 B2* | 2/2011 | Tanner | ............ | G07C 1/20 340/539.1 |
| 8,340,903 B2* | 12/2012 | Dorfman | ............ | G01C 21/20 340/995.11 |
| 8,935,095 B2* | 1/2015 | Hartman | ............ | G01C 21/20 340/146.2 |
| 9,014,660 B2* | 4/2015 | Pahlevani | ............ | H04W 4/22 455/404.1 |
| 9,301,088 B2* | 3/2016 | Kirk | ............ | G01C 21/20 |
| 2006/0109113 A1* | 5/2006 | Reyes | ............ | G08B 7/06 340/541 |
| 2007/0049259 A1* | 3/2007 | Onishi | ............ | A62B 99/00 455/414.2 |
| 2007/0298758 A1* | 12/2007 | Verma | ............ | G08B 27/006 455/404.1 |
| 2008/0258924 A1* | 10/2008 | Moss | ............ | G08B 17/10 340/577 |
| 2009/0079575 A1* | 3/2009 | Bouressa | ............ | G07C 9/00111 340/573.4 |
| 2009/0138353 A1* | 5/2009 | Mendelson | ............ | G01C 21/206 705/14.39 |
| 2009/0243845 A1* | 10/2009 | Kagawa | ............ | G08B 7/066 340/540 |
| 2010/0122284 A1* | 5/2010 | Yoon | ............ | H04N 5/4401 725/33 |
| 2010/0164732 A1* | 7/2010 | Wedig | ............ | G08B 7/066 340/577 |
| 2010/0245083 A1* | 9/2010 | Lewis | ............ | G08B 7/066 340/540 |
| 2011/0103302 A1* | 5/2011 | Hall | ............ | A63F 13/10 370/328 |
| 2011/0130636 A1* | 6/2011 | Daniel | ............ | G08B 25/016 600/301 |
| 2011/0191432 A1* | 8/2011 | Layson, Jr. | ............ | G06Q 30/02 709/206 |
| 2012/0102522 A1* | 4/2012 | Long | ............ | H04W 76/007 725/33 |
| 2012/0185897 A1* | 7/2012 | Gould | ............ | G08B 27/005 725/33 |
| 2013/0099919 A1* | 4/2013 | Cai | ............ | G01S 5/0009 340/539.13 |
| 2013/0103309 A1* | 4/2013 | Cai | ............ | H04W 4/22 701/515 |
| 2013/0116922 A1* | 5/2013 | Cai | ............ | G01C 21/206 701/515 |
| 2013/0147604 A1* | 6/2013 | Jones, Jr. | ............ | G08B 7/066 340/6.1 |
| 2013/0282280 A1* | 10/2013 | Patterson | ............ | G08B 7/062 701/533 |
| 2014/0132390 A1* | 5/2014 | Loveland | ............ | H05B 37/0227 340/5.8 |
| 2014/0143801 A1* | 5/2014 | Russell | ............ | H04N 21/814 725/33 |
| 2014/0253326 A1* | 9/2014 | Cho | ............ | H04W 4/22 340/539.13 |
| 2014/0293865 A1* | 10/2014 | Shi | ............ | G08B 21/10 370/312 |
| 2014/0340222 A1* | 11/2014 | Thornton | ............ | G08B 7/062 340/539.17 |
| 2015/0358796 A1* | 12/2015 | Sarna, II | ............ | H04W 4/22 455/404.2 |
| 2016/0047663 A1* | 2/2016 | Iyer | ............ | G01C 21/206 701/411 |
| 2016/0049064 A1* | 2/2016 | McNabb | ............ | G08B 21/10 340/540 |
| 2016/0161269 A1* | 6/2016 | Needham | ............ | G01C 21/3438 701/410 |
| 2016/0192033 A1* | 6/2016 | Kitahara | ............ | H04N 21/41415 725/33 |
| 2016/0205514 A1* | 7/2016 | Ikeda | ............ | H04W 4/043 455/456.1 |

FOREIGN PATENT DOCUMENTS

| | | |
|---|---|---|
| WO | WO-2015084415 A1 | 6/2015 |
| WO | WO-2015084415 A8 | 6/2015 |

OTHER PUBLICATIONS

"Intenrational Application Serial No. PCT/US2013/075466, International Search Report mailed Sep. 26, 2014", 3 pgs.

"International Application Serial No. PCT/US2013/075466, Written Opinion mailed Sep. 26, 2014", 10 pgs.

* cited by examiner

EMERGENCY EVACUATION SERVICE

This application is a U.S. National Stage Application under 35 U.S.C 371 form International Application No. PCT/US2013/075466, filed on Dec. 16, 2013, which is hereby incorporated by reference in its entirety.

TECHNICAL FIELD

Embodiments described herein generally relate to on-site navigation and in particular, to an emergency evacuation service.

BACKGROUND

Hundreds of thousands of people attend events at public and private venues every year. Concerts, art festivals, corporate conventions, and political events are merely a few examples of such events. When an emergency occurs, such as a fire, it is of the utmost importance to evacuate the venue as quickly as possible.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

In many cases, an attendee at an event is not familiar with the venue. When an emergency situation occurs, the attendee may not know the layout of the venue or the locations of emergency exits. Although many venues include emergency signage (e.g., wall map or overhead exit signs) and other mechanisms to assist evacuation (e.g., lights, sirens, etc.), signage may be obscured or damaged by smoke or fire, public address systems may be drowned out by screaming or other noise, evacuation systems may malfunction, or an emergency exit may be blocked or otherwise unavailable for exit. The embodiments described herein provide an alternative, interactive way of assisting evacuation during an emergency.

In this description, systems, methods, and machine-readable media including instructions are disclosed that provide an emergency evacuation service. The system incorporates a combination of location based services, known information about a venue, and personal devices of one or more people at the venue to provide the people with customized directions to exit the venue during an emergency. Using a location based service allows the system to provide real time updates that may be used to redirect people as the emergency situation changes. The system also includes support for venue administrators and emergency response personnel to directly change information, provide instructions, or otherwise communicate with people evacuating the venue via the personal devices. Such information may be provided using voice, text, video, or other visual indicators.

Thus, while existing methods include using a wall map in a room or hallway, printed or electronic signs, or a public address system to inform people how and when to evacuate, none of these will support individual situations and none of them are updateable in real time. The systems and methods disclosed herein support real time updating, provide emergency and administrative staff information on the location of patrons, and allow for specific directions to handle traffic flow and address changing situations.

Figure 1:
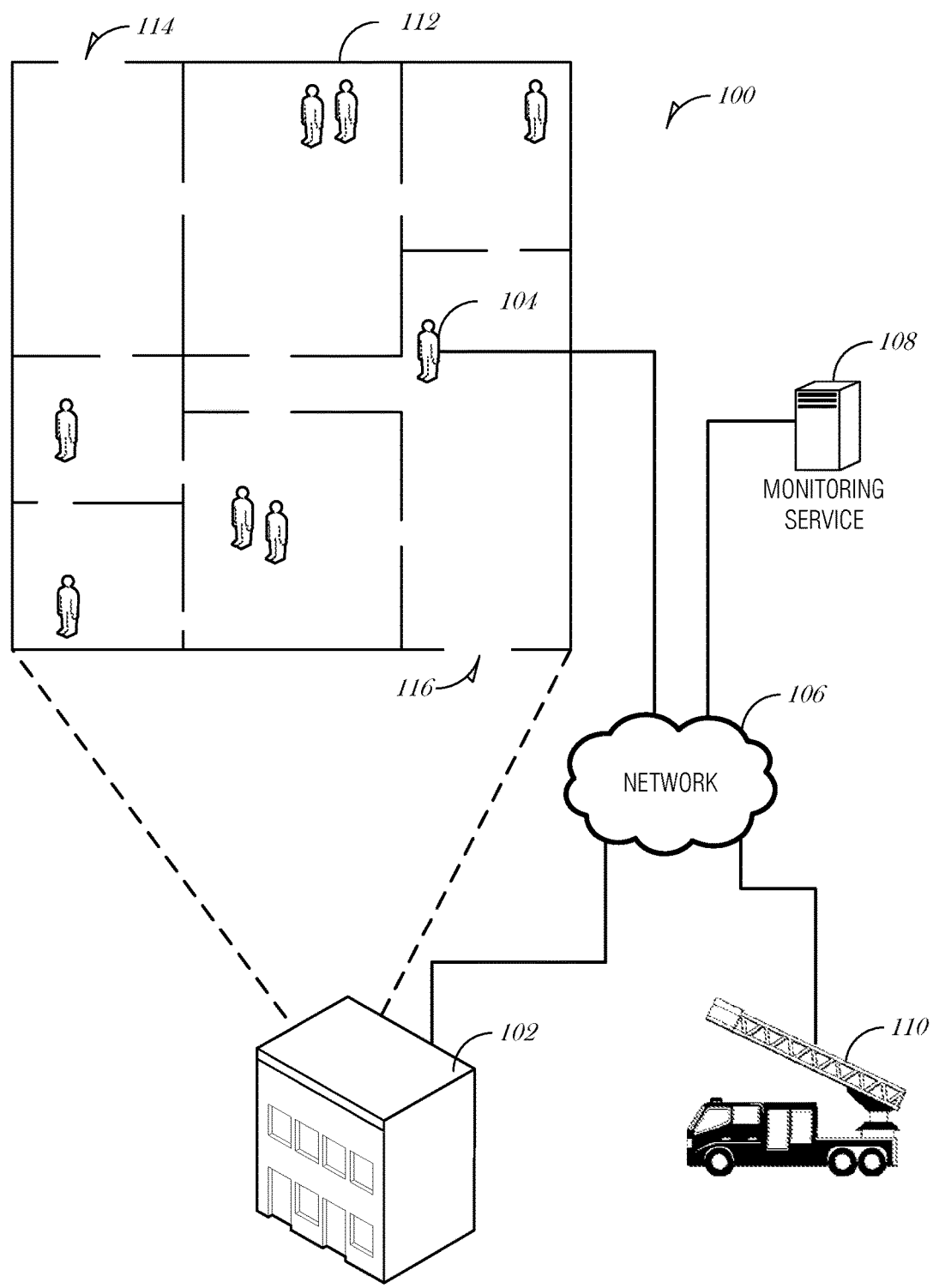
FIG. 1 is a schematic drawing illustrating an emergency evacuation service environment, according to an embodiment.

FIG. 1 is a schematic drawing illustrating an emergency evacuation service environment 100, according to an embodiment. A venue 102 may host an event, such as a conference, a meeting, a party, a concert, or the like. When an attendee 104 enters the premises of the venue 102, the attendee may be presented the option to download an application to a mobile device. The mobile device may be a smart phone, personal digital assistant, wearable device, tablet, hybrid, or other type of portable computing device. The mobile device may be provided to the attendee 104 by the organizers of the event or may be personally owned by the attendee 104. The application may provide additional information about the event, the venue 102, speakers or presenters at the event, hotel or eating options nearby the venue 102, transportation options to and from the venue 102, or the like. In an embodiment, the application may provide one or more maps of the venue 102, which may be used by the event organizer to advertise various meetings, displays, presentations, or other events within the larger event.

The venue 102 may be equipped with one or more monitoring systems, such as a fire alarm system, a security system, or the like. The monitoring system may be networked via a network 106, to a central monitoring service 108. The monitoring service 108 may monitor for alarm conditions at the venue, such as a security alarm or a fire alarm. When such an alarm is detected, the monitoring service 108 may alert emergency response personnel, such as fire response personnel 110.

Upon detection of an emergency event, such as a fire, the application installed on the attendee's mobile device may alert the attendee 104 of the situation and provide instructions on evacuation or other emergency response. For example, in the event of a fire, the application may provide instructions directing the attendee 104 to a particular exit route. As another example, in the event of a terrorist attack, the application may be used to provide instructions to the attendee 104 on how to react, such as by finding a safe place or moving to a particular area of the venue 102. When an emergency occurs, the standard exit information or emergency instructions may be displayed. As the emergency continues, emergency support personnel are able to update the information and send it to the attendee 104. If communications are lost during the evacuation, the most current information may be stored at the attendee's mobile device for continued display.

The emergency response personnel may be provided an interface to view the attendee's position. The mobile device of the attendee 104 may be used to provide location information to the monitoring service 108, which may act as a conduit for information to the emergency response personnel. Using the location information of the mobile devices of the attendees 104, the emergency response personnel may view approximate locations of the attendee 104 on a map 112 of the venue 102. Based on the information of the emergency, as it unfolds and develops, the emergency response personnel may provide updated instructions to the attendee 104 via the network 106 and the mobile device used by the attendee 104. For example, if an exit 114 is blocked by a fire or debris, the fire response personnel 110 may direct the attendee 104 to another exit 116. As another example, if too many people are moving to one exit 114, which could cause delays in the evacuation because of an overload in traffic attempting to exit the venue 102 at a particular exit 114, then the fire response personnel 110 may direct some of the attendees to another exit 116. Thus, the system provides a mechanism to control traffic flow of the evacuation.

In an embodiment, the mobile device may be used as another sensor for emergency response personnel. For example, the mobile device may be equipped with a camera, which may be used to allow the emergency response personnel to view pictures or video from the attendee's position.

Figure 2:
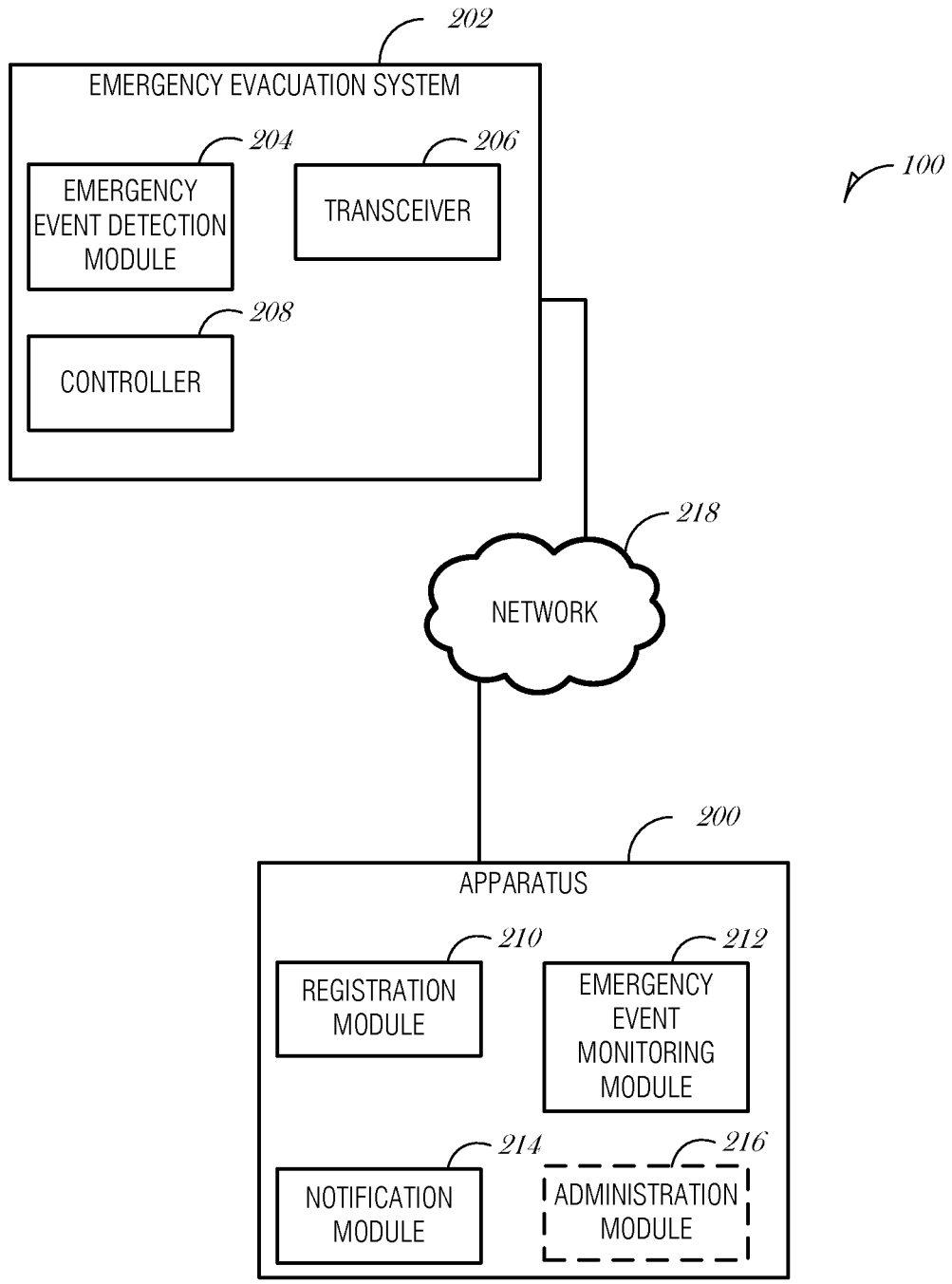
FIG. 2 is block diagram of an example of a system for an emergency evacuation service, according to an embodiment.

FIG. 2 is a block diagram illustrating an apparatus 200 and an emergency evacuation system 202, according to an embodiment. The apparatus 200 and emergency evacuation system 202 may be communicatively coupled by a network 218. The apparatus 200 may include an emergency event detection module 204, a transceiver 206, and a controller 208. The apparatus 200 may be a mobile device, a smart phone, or a personal digital assistant, in various embodiments.

The emergency event detection module 204 may be used to detect the existence of an emergency event at a venue. For example, the emergency event detection module 204 may include or be communicatively coupled with one or more sensors (e.g., a microphone) to detect an alarm, such as a fire alarm, or other sounds that may indicate an emergency situation (e.g., a gunshot or an explosion). Thus, in an embodiment, the emergency event detection module 204 is adapted to detect the existence of the emergency event by a sensor value from a sensor installed in the apparatus 200. Alternatively, or in addition to, the emergency event detection module 204 may communicate with a local or remote system. Thus, in an embodiment, the emergency event detection module 204 is adapted to detect the existence of the emergency event by receiving a message from an emergency evacuation system 202, which may be local or remote from the venue. In an embodiment, the emergency evacuation system 202 is hosted in a cloud server system. A cloud server system may provide quick scalability in the event of a large evacuation effort. In another embodiment, the emergency event detection module 204 is adapted to detect the existence of the emergency event by receiving a message from a fire alarm service.

The transceiver 206 may be used to request and receive evacuation instructions from an emergency evacuation system 202, in response to detecting the existence of the emergency event. The emergency evacuation system 202 may be hosted at the venue or remote from the venue, or distributed between the venue and a remote location.

The controller 208 may be used to process the evacuation instructions and display to a user of the apparatus 200, information related to the evacuation instructions. The information related to the evacuation instructions may include at least one of a map and a route. The map may be a portion of a building, such as a particular floor or portion of a floor specific to the attendee/evacuee's location. The route may be an evacuation route or a route to a safe place within the building.

During an evacuation, the situation may change and evacuees may be provided new or updated instructions. Thus, in an embodiment, the transceiver 206 is adapted to receive an update to the evacuation instructions, and the controller 208 is adapted to process the update to the evacuation instructions and display updated information.

When a user first enters the venue, the user may register the user's device with an emergency evacuation system 202. Thus, in an embodiment, the transceiver 206 is adapted to transmit a registration from the apparatus 200 to the emergency evacuation system 202, the registration confirming that the apparatus 200 is located at the venue and indicating that the apparatus should receive emergency alerts from the emergency evacuation system 202. As part of the registration process, the user's device (e.g., apparatus 200) is put on a list of devices to receive emergency alerts or evacuation information. To enable tracking, identification information is provided to the emergency evacuation system 202. Thus, in an embodiment, the transceiver 206 is adapted to transmit identification information to the emergency evacuation system 202, the identification information uniquely identifying the apparatus 200. The user's device's location may also be tracked to approximate the location of the user. Thus, in an embodiment, the transceiver 206 is adapted to transmit location information to the emergency evacuation system 202, the location information specifying the location of the apparatus 200.

The emergency evacuation system 202 may include a registration module 210, an emergency event monitoring module 212, and a notification module 214. The registration module 210 may be used to receive a registration request from a user device (e.g., apparatus 200), the registration request including an identification of the user device and a location of the user device. The location of the user device may be used to determine an effective and efficient evacuation route. Thus, in an embodiment, the route is based on the location of the user device.

The emergency event monitoring module 212 may be used to monitor the location of the user device for an emergency event. The location of the user device may indicate a venue, and the emergency event monitoring module 212 may monitor a plurality of user devices at the venue. In the event of an emergency, the locations of the user devices provide insight into where people are and where they are moving. The emergency event monitoring module 212 may be used to provide traffic flow analysis of the plurality of user devices at the venue. The traffic flow analysis may be used to identify congested escape routes and redirect traffic to evacuate people in an efficient and expedient manner.

The notification module 214 may be used to notify the user device when the emergency event occurs and provide the user device additional information. The notification module 214 may be adapted to notify the user device of traffic congestion at an exit from the venue based on the traffic flow analysis.

The emergency evacuation system 202 may also include an administration module 216 used to receive an update from an administrative client regarding the emergency event, where the notification module is adapted to communicate information related to the update to the user device.

Figure 3:
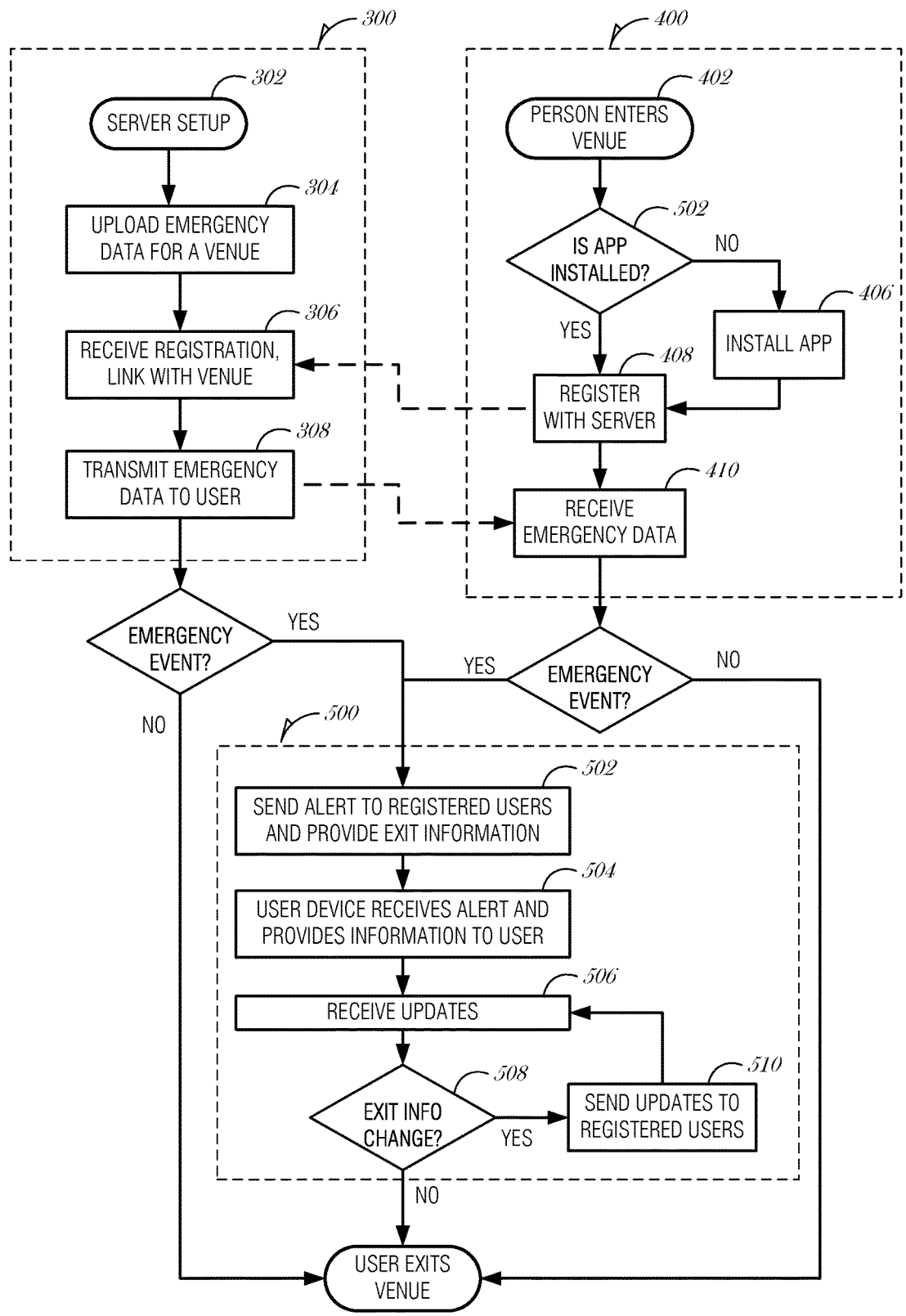
FIG. 3 is a flowchart illustrating a portion of an evacuation method, according to an embodiment.

FIG. 3 is a flowchart illustrating various processes, according to an embodiment. The server-side process 300 begins at block 302, where a service is setup. At block 304, emergency data for a venue is uploaded to the server. The server may be located in a cloud. The data for the venue may include map data, equipment data, location data, and other data that describes the venue, available emergency services, and the like. For example, the data for the venue may include the venue's address, a building type (e.g., office building, conference hall, apartment building, or residential building), types of services available in the venue (e.g., built-in sprinkler system, security alarms, cameras, etc.), age of the venue, construction, and other attributes of the venue or surrounding buildings/grounds. The data for the venue may also include maps for each floor, portions of floors, etc., which may include routes to use for evacuation or to move to a safe location. For example, the data may include a route for fire evacuation, a route to move to a safe place during a tornado warning, or a route to a safe place during a terrorist attack.

The client-side process 400 begins at block 402, where a person enters a venue with a mobile device. In an embodiment, the person may opt-in to an emergency assistance service. After the person enters the venue, the mobile device determines whether an emergency assistance application is installed on the mobile device (block 404). The emergency assistance application may be used to provide maps, alerts, or other information to the person in the event of an emergency on the premises of the venue. If the emergency assistance application is not installed, then the person is presented the option to install it and the application may be installed (block 406). The application may be installed from an application repository, such as an application store associated with the mobile device. Once the emergency assistance application is installed, the mobile device may register with the server (block 408), where registering will indicate that the mobile device is at the venue and is requesting emergency data in the event of an emergency. The registration may also include an identifier and location information for the mobile device. The identifier may be a unique identifier, such as a unique device ID that is imprinted in the read-only memory of the device, a subscriber identity module, a username, or other identifying information.

Returning to the server-side process 300, the server may receive the registration from the mobile device, and link the venue data with the mobile device (block 306). The relationship between the venue data and the mobile device may be stored in a database. The server may then transmit the emergency data to the mobile device (block 308). At 410, the mobile device receives the emergency data. The emergency data may include maps, routes, or other instructions describing what to do in various possible emergency situations.

When an emergency occurs, the emergency evacuation process 500 begins. The server sends an alert to the registered users and provides exit information (block 502). The user's mobile device alerts the user and once the user acknowledges the alert, the mobile device presents emergency data to the user (block 504). The emergency data may be default evacuation instructions, maps, or other data. As the emergency evolves, updated information may be provided from emergency personnel on-site or from an intelligent agent at the server, which may then be presented to the user (block 506). When an exit or destination is changed (block 508), then the server provides information to the mobile device with the updated information (block 510). The updated information may be individualized to the person based on the person's location, exit congestion, the person's abilities (e.g., in a wheelchair), and the like.

Figure 4:
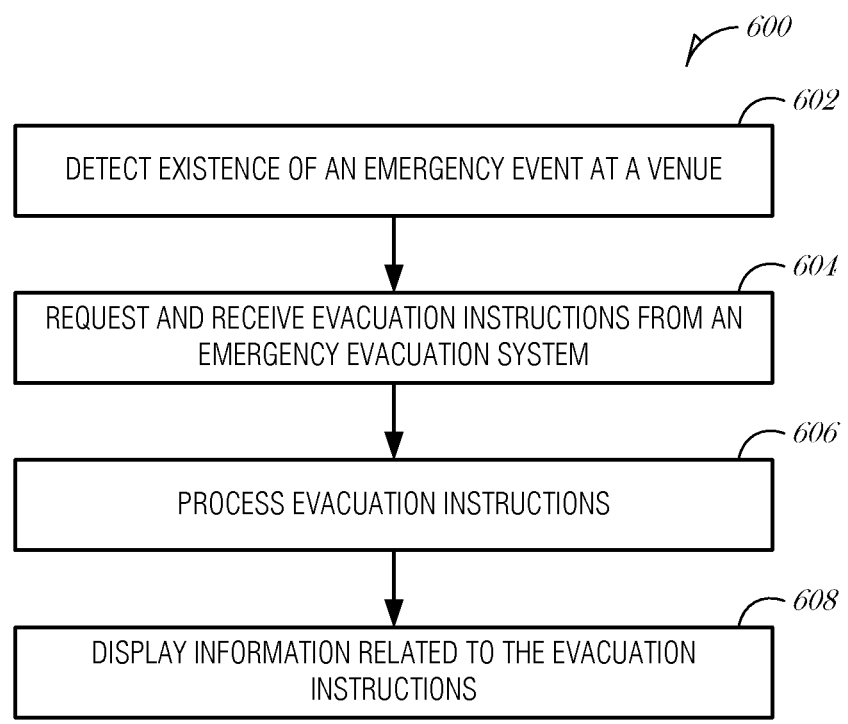
FIG. 4 is a flowchart illustrating a method to provide an emergency evacuation service, according to an embodiment.

FIG. 4 is a flowchart illustrating a method 600 for providing an emergency evacuation service, according to an embodiment. At block 602, the existence of an emergency event at a venue is detected. The existence of the emergency event may be detected at a user device. In various embodiments, the user device comprises a mobile device, a smart phone, or a personal digital assistant. In an embodiment, detecting the existence of the emergency event comprises using a sensor value from a sensor installed in the user device. In an embodiment, detecting the existence of the emergency event comprises receiving a message from the emergency evacuation system. In an embodiment, detecting the existence of the emergency event comprises receiving a message from a fire alarm service. In an embodiment, the emergency evacuation system is a cloud server system.

At block 604, evacuation instructions are requested and received from an emergency evacuation system at the user device, in response to detecting the existence of the emergency event. In an embodiment, the information related to the evacuation instructions comprises at least one of a map and a route.

At block 606, the evacuation instructions are processed with the user device.

At block 608, information related to the evacuation instructions is displayed to a user of the user device.

In an embodiment, the method 600 includes receiving an update to the evacuation instructions; processing the update to the evacuation instructions; and displaying the updated information.

In an embodiment, a registration is transmitted from the user device to the emergency evacuation system, the registration confirming that the user device is located at the venue and indicating that the user device should receive emergency alerts from the emergency evacuation system. In an embodiment, identification information is transmitted to the emergency evacuation system, the identification information uniquely identifying the user device. In an embodiment, location information is transmitted to the emergency evacuation system, the location information specifying the location of the user device.

While some of the examples described herein refer to a building as the venue, it is understood that any venue is encompassed by this description, including, but not limited to a building, an airplane, a city, a cruise ship, or the like.

Embodiments may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

Examples, as described herein, may include, or may operate on, logic or a number of components, modules, or mechanisms. Modules may be hardware, software, or firmware communicatively coupled to one or more processors in order to carry out the operations described herein. Modules may hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Figure 5:
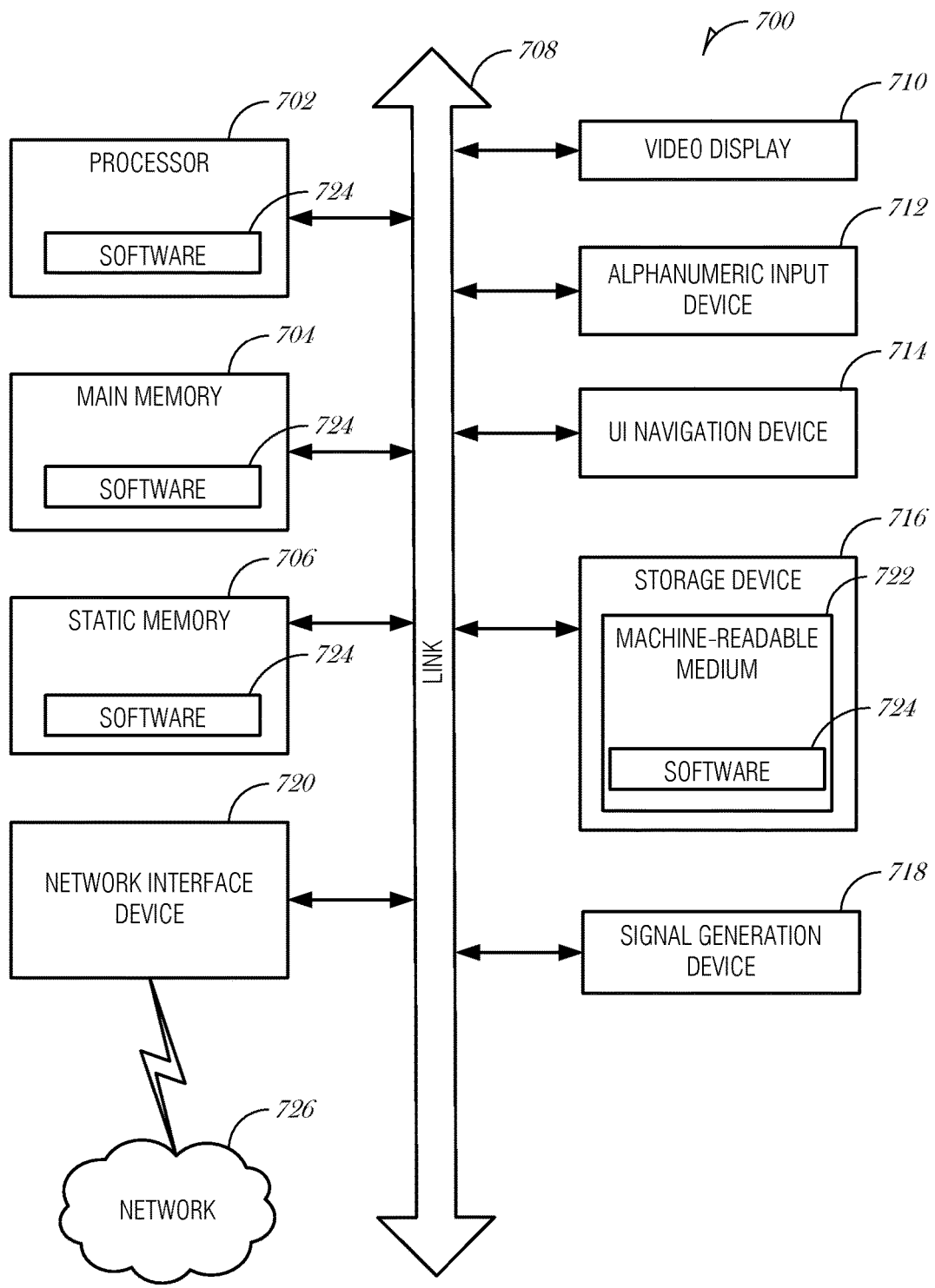
FIG. 5 is a block diagram illustrating an example machine upon which any one or more of the techniques (e.g., methodologies) discussed herein may perform, according to an example embodiment.

FIG. 5 is a block diagram illustrating a machine in the example form of a computer system 700, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be an onboard vehicle system, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 700 includes at least one processor 702 (e.g., a central processing unit (CPU), a graphics processing unit (GPU) or both, processor cores, compute nodes, etc.), a main memory 704 and a static memory 706, which communicate with each other via a link 708 (e.g., bus). The computer system 700 may further include a video display unit 710, an alphanumeric input device 712 (e.g., a keyboard), and a user interface (UI) navigation device 714 (e.g., a mouse). In one embodiment, the video display unit 710, input device 712 and UI navigation device 714 are incorporated into a touch screen display. The computer system 700 may additionally include a storage device 716 (e.g., a drive unit), a signal generation device 718 (e.g., a speaker), a network interface device 720, and one or more sensors (not shown), such as a global positioning system (GPS) sensor, compass, accelerometer, or other sensor.

The storage device 716 includes a machine-readable medium 722 on which is stored one or more sets of data structures and instructions 724 (e.g., software) embodying or utilized by any one or more of the methodologies or functions described herein. The instructions 724 may also reside, completely or at least partially, within the main memory 704, static memory 706, and/or within the processor 702 during execution thereof by the computer system 700, with the main memory 704, static memory 706, and the processor 702 also constituting machine-readable media.

While the machine-readable medium 722 is illustrated in an example embodiment to be a single medium, the term "machine-readable medium" may include a single medium or multiple media (e.g., a centralized or distributed database, and/or associated caches and servers) that store the one or more instructions 724. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 724 may further be transmitted or received over a communications network 726 using a transmission medium via the network interface device 720 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Additional Notes & Examples

Example 1 includes subject matter (such as a device, apparatus, or machine) comprising a system to provide an emergency evacuation service, comprising an emergency event detection module to detect the existence of an emergency event at a venue; a transceiver to request and receive evacuation instructions from an emergency evacuation system, in response to detecting the existence of the emergency event; and a controller to process the evacuation instructions and display, to a user of the apparatus, information related to the evacuation instructions.

In Example 2, the subject matter of Example 1 may optionally include, wherein the apparatus comprises a mobile device, a smart phone, or a personal digital assistant.

In Example 3, the subject matter of any one or more of Examples 1 to 2 may optionally include, wherein the emergency event detection module is to detect the existence of the emergency event by a sensor value from a sensor installed in the apparatus.

In Example 4, the subject matter of any one or more of Examples 1 to 3 may optionally include, wherein the emergency event detection module is to detect the existence of the emergency event by receiving a message from the emergency evacuation system.

In Example 5, the subject matter of any one or more of Examples 1 to 4 may optionally include, wherein the emergency event detection module is to detect the existence of the emergency event by receiving a message from a fire alarm service.

In Example 6, the subject matter of any one or more of Examples 1 to 5 may optionally include, wherein the emergency evacuation system is hosted in a cloud server system.

In Example 7, the subject matter of any one or more of Examples 1 to 6 may optionally include, wherein the transceiver is to receive an update to the evacuation instructions, and wherein the controller is to process the update to the evacuation instructions and display updated information.

In Example 8, the subject matter of any one or more of Examples 1 to 7 may optionally include, wherein the information related to the evacuation instructions comprises at least one of a map and a route.

In Example 9, the subject matter of any one or more of Examples 1 to 8 may optionally include, wherein the transceiver is to transmit a registration from the apparatus to the emergency evacuation system, the registration confirming that the apparatus is located at the venue and indicating that the apparatus should receive emergency alerts from the emergency evacuation system.

In Example 10, the subject matter of any one or more of Examples 1 to 9 may optionally include, wherein the transceiver is to transmit identification information to the emergency evacuation system, the identification information uniquely identifying the apparatus.

In Example 11, the subject matter of any one or more of Examples 1 to 10 may optionally include, wherein the transceiver is adapted to transmit location information to the emergency evacuation system, the location information specifying the location of the apparatus.

In Example 12, the subject matter of any one or more of Examples 1-11 may optionally include, wherein the route is based on the location of the apparatus.

Example 13 includes subject matter for providing an emergency evacuation service (such as a method, means for performing acts, machine readable medium including instructions that when performed by a machine cause the machine to performs acts, or an apparatus configured to perform) comprising detecting, at a user device, the existence of an emergency event at a venue; requesting and receiving evacuation instructions from an emergency evacuation system at the user device, in response to detecting the existence of the emergency event; processing the evacuation instructions with the user device; and displaying to a user of the user device, information related to the evacuation instructions.

In Example 14, the subject matter of Example 13 may optionally include, wherein the user device comprises a mobile device, a smart phone, or a personal digital assistant.

In Example 15, the subject matter of any one or more of Examples 13 to 14 may optionally include, wherein detecting the existence of the emergency event comprises using a sensor value from a sensor installed in the user device.

In Example 16, the subject matter of any one or more of Examples 13 to 15 may optionally include, wherein detecting the existence of the emergency event comprises receiving a message from the emergency evacuation system.

In Example 17, the subject matter of any one or more of Examples 13 to 16 may optionally include, wherein detecting the existence of the emergency event comprises receiving a message from a fire alarm service.

In Example 18, the subject matter of any one or more of Examples 13 to 17 may optionally include, wherein the emergency evacuation system is a cloud server system.

In Example 19, the subject matter of any one or more of Examples 13 to 18 may optionally include, receiving an update to the evacuation instructions; processing the update to the evacuation instructions; and displaying the updated information.

In Example 20, the subject matter of any one or more of Examples 13 to 19 may optionally include, wherein the information related to the evacuation instructions comprises at least one of a map and a route.

In Example 21, the subject matter of any one or more of Examples 13 to 20 may optionally include, transmitting a registration from the user device to the emergency evacuation system, the registration confirming that the user device is located at the venue and indicating that the user device should receive emergency alerts from the emergency evacuation system.

In Example 22, the subject matter of any one or more of Examples 13 to 21 may optionally include, transmitting identification information to the emergency evacuation system, the identification information uniquely identifying the user device.

In Example 23, the subject matter of any one or more of Examples 13 to 22 may optionally include, transmitting location information to the emergency evacuation system, the location information specifying the location of the user device.

In Example 24, the subject matter of any one or more of Examples 13-23 may optionally include, wherein the route is based on the location of the user device.

Example 25 includes subject matter for providing an emergency evacuation service comprising means for performing any one of the examples of 1-24.

Example 26 includes an apparatus for providing an emergency evacuation service, the apparatus comprising: means for detecting, at a user device, the existence of an emergency event at a venue; means for requesting and receiving evacuation instructions from an emergency evacuation system at the user device, in response to detecting the existence of the emergency event; means for processing the evacuation instructions with the user device; and means for displaying to a user of the user device, information related to the evacuation instructions.

Example 27 includes subject matter (such as a device, apparatus, or machine) comprising a system to provide an emergency evacuation service, comprising a registration module to receive a registration request from a user device, the registration request including an identification of the user device and a location of the user device; an emergency event monitoring module to monitor the location of the user device during an emergency event; and a notification module to notify the user device when the emergency event occurs and provide the user device additional information.

In Example 28, the subject matter of Example 27 may optionally include, an administration module to receive an update from an administrative client regarding the emergency event, wherein the notification module is to communicate information related to the update to the user device.

In Example 29, the subject matter of any one or more of Examples 27 to 28 may optionally include, wherein the location of the user device indicates a venue, and wherein the emergency event monitoring module monitors a plurality of user devices at the venue.

In Example 30, the subject matter of any one or more of Examples 27 to 29 may optionally include, wherein the emergency event monitoring module is to provide traffic flow analysis of the plurality of user devices at the venue.

In Example 31, the subject matter of any one or more of Examples 27 to 30 may optionally include, wherein the notification module is to notify the user device of traffic congestion at an exit from the venue based on the traffic flow analysis.

Example 32 includes subject matter for providing an emergency evacuation service (such as a method, means for performing acts, machine readable medium including instructions that when performed by a machine cause the machine to performs acts, or an apparatus configured to perform) comprising receiving a registration request from a user device, the registration request including an identification of the user device and a location of the user device; monitoring the location of the user device during an emergency event; and notifying the user device when the emergency event occurs and provide the user device additional information.

In Example 33, the subject matter of Example 32 may optionally include, receiving an update from an administrative client regarding the emergency event, wherein the notification module is to communicate information related to the update to the user device.

In Example 34, the subject matter of any one or more of Examples 32 to 33 may optionally include, wherein the location of the user device indicates a venue, and comprising monitoring a plurality of user devices at the venue.

In Example 35, the subject matter of any one or more of Examples 32 to 34 may optionally include, providing traffic flow analysis of the plurality of user devices at the venue.

In Example 36, the subject matter of any one or more of Examples 32 to 35 may optionally include, notifying the user device of traffic congestion at an exit from the venue based on the traffic flow analysis.

Example 37 includes subject matter for providing an emergency evacuation service comprising means for performing any one of the examples of 27-36.

Example 38 includes an apparatus for providing an emergency evacuation service, the apparatus comprising means for receiving a registration request from a user device, the registration request including an identification of the user device and a location of the user device; means for monitoring the location of the user device during an emergency event; and means for notifying the user device when the emergency event occurs and provide the user device additional information.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure, for example, to comply with 37 C.F.R. §1.72(b) in the United States of America. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A non-transitory machine-readable medium including instructions for providing an emergency evacuation service, which when executed by a machine, cause the machine to:
   detect, at a user device, the existence of an emergency event at a venue;
   request and receive evacuation instructions from an emergency evacuation system at the user device, in response to detecting the existence of the emergency event;
   process the evacuation instructions with the user device; and
   display to a user of the user device, information related to the evacuation and traffic congestion at an exit of the venue.

2. The non-transitory machine-readable medium of claim 1, wherein the user device comprises a mobile device, a smart phone, or a personal digital assistant.

3. The non-transitory machine-readable medium of claim 1, wherein the instructions to detect the existence of the emergency event comprise instructions to use a sensor value from a sensor installed in the user device.

4. The non-transitory machine-readable medium of claim 1, wherein the instructions to detect the existence of the emergency event comprise instructions to receive a message from the emergency evacuation system.

5. The non-transitory machine-readable medium of claim 1, wherein the instructions to detect the existence of the emergency event comprise instructions to receive a message from a fire alarm service.

6. The non-transitory machine-readable medium of claim 1, wherein the emergency evacuation system is a cloud server system.

7. The non-transitory machine-readable medium of claim 1, comprising instructions to:
   receive an update to he evacuation instructions;
   process the update to the evacuation instructions; and
   display the updated information.

8. The non-transitory machine-readable medium of claim 1, wherein the information related to the evacuation instructions comprises at least one of a map and a route.

9. The non-transitory machine-readable medium of claim 1, comprising instructions to transmit a registration from the user device to the emergency evacuation system, the registration confirming that the user device is located at the venue and indicating that the user device should receive emergency alerts from the emergency evacuation system.

10. The non-transitory machine-readable medium of claim 9, comprising instructions to transmit identification information to the emergency evacuation system, the identification information uniquely identifying the user device.

11. The non-transitory machine-readable medium of claim 9, comprising instructions to transmit location information to the emergency evacuation system, the location information specifying the location of the user device.

12. An apparatus to provide an emergency evacuation service, the apparatus comprising:
   an emergency event detection module to detect the existence of an emergency event a venue;
   a transceiver to request and receive evacuation instructions from an emergency evacuation system, in response to detecting the existence of the emergency event; and
   a controller to process the evacuation instructions and display, to a user of the apparatus, information related to the evacuation instructions and traffic congestion at an exit of the venue.

13. The apparatus of claim 12, wherein the apparatus comprises a mobile device, a smart phone, or a personal digital assistant.

14. The apparatus of claim 12, wherein the emergency event detection module is to detect the existence of the emergency event by a sensor value from a sensor installed in the apparatus.

15. The apparatus of claim 12, wherein the emergency event detection module is to detect the existence of the emergency event by receiving a message from the emergency evacuation system.

16. The apparatus of claim 12, wherein the emergency event detection module is to detect the existence of the emergency event by receiving a message from a fire alarm service.

17. The apparatus of claim 12, wherein the transceiver is to receive an update to the evacuation instructions, and wherein the controller is to process the update to the evacuation instructions and display updated information.

18. The apparatus of claim 12, wherein the transceiver is to transmit a registration from the apparatus to the emergency evacuation system, the registration confirming that the apparatus is located at the venue and indicating that the apparatus should receive emergency alerts from the emergency evacuation system.

19. The apparatus of claim 18, wherein the transceiver is to transmit identification information to the emergency evacuation system, the identification information uniquely identifying the apparatus.

20. A method for providing an emergency evacuation service, the method comprising:
   detecting, at a user device, the existence of an emergency event at a venue;
   requesting and receiving evacuation instructions from an emergency evacuation system at the user device, in response to detecting the existence of the emergency event;
   processing the evacuation instructions with the user device; and
   displaying to a user of the user device, information related to the evacuation instructions and traffic congestion at an exit of the venue.

* * * * *

UNITED STATES PATENT AND TRADEMARK OFFICE
CERTIFICATE OF CORRECTION

PATENT NO. : 9,681,280 B2
APPLICATION NO. : 14/353627
DATED : June 13, 2017
INVENTOR(S) : Balthasar et al.

Page 1 of 1

It is certified that error appears in the above-identified patent and that said Letters Patent is hereby corrected as shown below:

On the Title Page

In item (22), in "PCT Filed", in Column 1, Line 1, delete "Dec. 6, 2013" and insert --Dec. 16, 2013-- therefor In the Claims In Column 12, Line 63, in Claim 1, after "evacuation", insert --instructions--

In Column 13, Line 18, in Claim 7, delete "he" and insert --the-- therefor

In Column 13, Line 42, in Claim 12, after "event", insert --at--

Signed and Sealed this
Tenth Day of April, 2018

Andrei Iancu
*Director of the United States Patent and Trademark Office*